J. A. WILCOX.
Cow-Fetter.
No. 204,933.      Patented June 18, 1878.
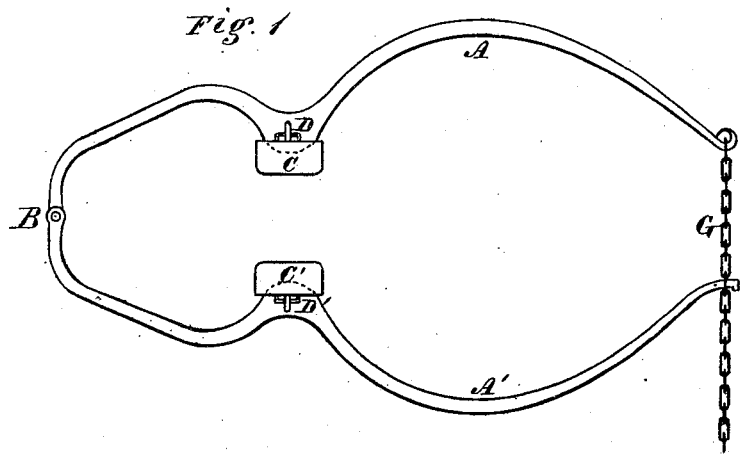
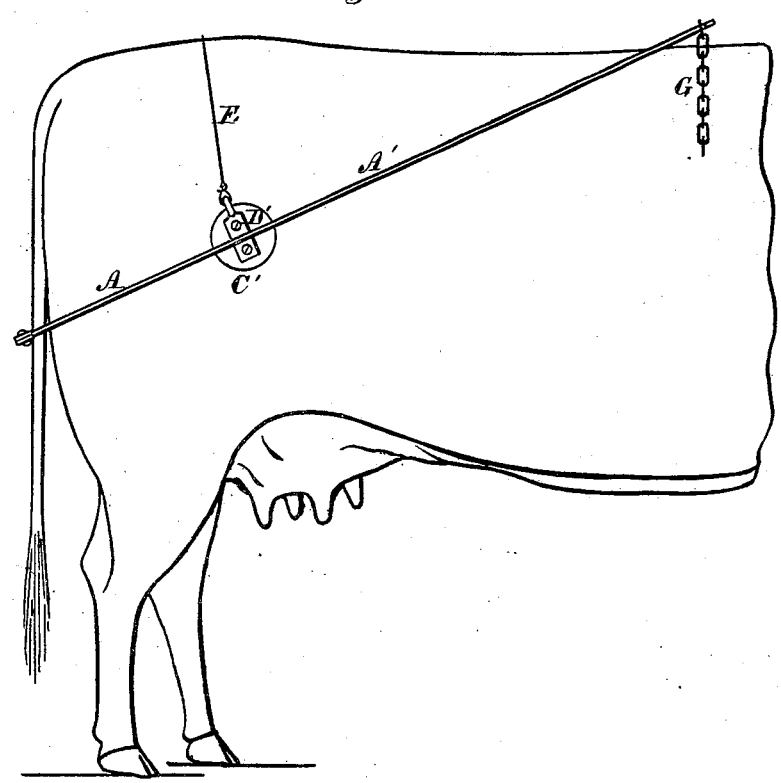
Witnesses.
Wendell R. Curtis
Willard Eddy
Inventor.
James A. Wilcox
by Theo. G. Ellis, Attorney

UNITED STATES PATENT OFFICE.

JAMES A. WILCOX, OF ROCKY HILL, CONNECTICUT.

IMPROVEMENT IN COW-FETTERS.

Specification forming part of Letters Patent No. 204,933, dated June 18, 1878; application filed April 8, 1877.

*To all whom it may concern:*

Be it known that I, JAMES A. WILCOX, of Rocky Hill, in the county of Hartford and State of Connecticut, have invented a new and useful Cow-Fetter; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to apparatus for holding and confining the hind legs and tail of a cow during the process of milking, so as to prevent her kicking or switching her tail.

My invention consists in a jointed frame, which passes around the rear end of the cow and is clasped over the back, and which is furnished with pads on the sides to press into the flanks just forward of the leg-bones, and in its application to the purpose intended.

In the accompanying drawing, Figure 1 shows a top view of my improved apparatus. Fig. 2 shows a side view of the same applied to a cow.

A and A' are two bars, bent or forged into the shape shown in the drawing, and united by a hinge at B.

C and C' are pads or blocks attached to the side bars A and A', for the purpose of pressing into the flanks of the animal just forward of the leg-bone, so as to prevent it from being drawn forward in the act of kicking. These pads are attached to the side bars loosely, so that they will have some play to accommodate themselves to the shape of the body of the cow.

In the drawing the pads are secured to the side bars by the bolts D and D', which pass loosely through holes in the side bars, so as to give the required play, said bolts being screwed or otherwise fastened to the backs of the pads.

At the tops of the bolts D and D' are small loops, into which a cord or strap, E, is fastened, which passes over the rump of the cow, to support the apparatus in place.

G is a chain, which is fastened to one of the side bars A by means of a ring, and the links of which are adapted to hook onto the end of the other side bar, so as to secure the ends together at any desired distance apart.

The operation of my invention is as follows: The apparatus is passed over the rump of the animal and brought down into the position shown in Fig. 2. The two ends of the side bars are then drawn together and secured by hooking the chain. In this position the rear end of the apparatus confines the tail, and the pads press into the flanks of the cow to prevent kicking. The animal is thus securely held during the operation of milking.

I am aware of the patent granted to T. Pyle, August 27, 1872, and do not claim anything shown therein.

What I claim as my invention is—

1. The combination of the jointed side bars A A', the pads C C', the support E, and a chain or fastening, G, substantially as and for the purpose herein described.

2. The pads C C', in combination with bars A A', adapted to pass around the rear of the cow and to be secured over the back, for holding the tail and preventing kicking, substantially as herein described.

JAMES A. WILCOX.

Witnesses:
E. E. SPERKEE,
SAMUEL DIMOCK.